(12) United States Patent
Bartik et al.

(10) Patent No.: US 7,870,438 B2
(45) Date of Patent: Jan. 11, 2011

(54) METHOD, SYSTEM AND COMPUTER PROGRAM PRODUCT FOR SAMPLING COMPUTER SYSTEM PERFORMANCE DATA

(75) Inventors: Jane H. Bartik, Poughkeepsie, NY (US); Martin Recktenwald, Steinenbronn (DE); Chung-Lung Kevin Shum, Wappingers Falls, NY (US); Scott B. Swaney, Germantown, NY (US); Patrick M. West, Jr., Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 398 days.

(21) Appl. No.: 12/031,727

(22) Filed: Feb. 15, 2008

(65) Prior Publication Data

US 2009/0210752 A1      Aug. 20, 2009

(51) Int. Cl.
*G06F 11/00* (2006.01)
(52) U.S. Cl. .......................... 714/45; 714/47; 702/182; 702/186; 717/124
(58) Field of Classification Search ....................... None
See application file for complete search history.

(56) References Cited

U.S. PATENT DOCUMENTS

| | | | |
|---|---|---|---|
| 4,590,550 A | 5/1986 | Eilert et al. | |
| 4,821,178 A | 4/1989 | Levin et al. | |
| 5,151,981 A * | 9/1992 | Westcott et al. | 714/50 |
| 6,249,886 B1 | 6/2001 | Kalkunte | |
| 6,507,805 B1 * | 1/2003 | Gordon et al. | 702/186 |
| 6,665,823 B2 | 12/2003 | Lee | |
| 6,678,883 B1 * | 1/2004 | Berry et al. | 717/128 |
| 6,857,014 B1 | 2/2005 | Paterson et al. | |
| 7,047,521 B2 | 5/2006 | Bunnell | |
| 7,099,797 B1 | 8/2006 | Richard | |
| 7,233,843 B2 | 6/2007 | Budhraja et al. | |
| 7,278,048 B2 | 10/2007 | Clark et al. | |
| 7,278,063 B2 | 10/2007 | Billeci et al. | |
| 2002/0002442 A1 | 1/2002 | Rivin et al. | |
| 2005/0183065 A1 | 8/2005 | Wolczko et al. | |
| 2007/0043485 A1 | 2/2007 | Meissner | |
| 2007/0220495 A1 * | 9/2007 | Chen et al. | 717/130 |

FOREIGN PATENT DOCUMENTS

JP          2001142747         5/2001

OTHER PUBLICATIONS z/Architecture, Principles of Operation, Sixth Edition, Apr. 2007, Publication No. SA22-7832-05, copyright IBM Corp. 1990-2007, pp. 1-1218.

(Continued)

*Primary Examiner*—Christopher S McCarthy
(74) *Attorney, Agent, or Firm*—Cantor Colburn LLP; John Campbell

(57) ABSTRACT

A system, method and computer program product for sampling computer system performance data are provided. The system includes a sample buffer to store instrumentation data while capturing trace data in a trace array, where the instrumentation data enables measurement of computer system performance. The system further includes a sample interrupt generator to assert a sample interrupt indicating that the instrumentation data is available to read. The sample interrupt is asserted in response to storing the instrumentation data in the sample buffer.

19 Claims, 4 Drawing Sheets

OTHER PUBLICATIONS

E. Barakat et al., Procedure for Developing Data for Maintenance Assurance Test and Basic Assurance Test for Use in RAS Analysis of Computer Systems, IBM Technical Disclosure Bulletin, 1986, 3 pages.

L. C. Heller, et al., Millicode in an IBM zSeries Processor, IBM J. Res. & Dev., vol. 48 No. 3/4, May/Jul. 2004, 10 pages.

U.S. Appl. No. 12/031,735, filed Feb. 15, 2008.

* cited by examiner

METHOD, SYSTEM AND COMPUTER PROGRAM PRODUCT FOR SAMPLING COMPUTER SYSTEM PERFORMANCE DATA

BACKGROUND OF THE INVENTION

This invention generally relates to computer system performance monitoring. More specifically, the invention relates to sampling computer system performance data without impacting reliability, availability and serviceability of the computer system.

Computer system performance measurement enables detection of issues that can result in reduced throughput of the computer system. One approach to measuring performance is to repeatedly execute workload instruction streams, which are often segments of customer workload code targeted to stress particular hardware and/or software functions, and collect data relevant to the system's performance. Initially, hardware captures selected signals and stores them in hardware arrays for further analysis. Each group of the selected signals is called a "sample". When enough samples have been captured to fill the arrays, a hardware interrupt invokes firmware to move the data from the arrays to storage. A set of controls provides flexibility for a user (e.g., a measurement team member) in selecting which signals are captured and when the selected data is captured. The captured data are later used for calculating performance analysis metrics such as cycles per instruction (CPI), cache misses/hits, pipeline stalls, and the like. Basic mechanisms for data capturing and performance measurement, also referred to as "instrumentation", are described in U.S. Pat. Nos. 4,590,550, and 4,821,178, each of which is hereby incorporated herein by reference in its entirety.

Historically, to reduce hardware footprint, instrumentation has taken advantage of hardware arrays already existing in a design. These arrays were originally intended for hardware tracing to capture machine states over a period of time for debug data. When a failure occurs, the data in the arrays, once extracted, serve as a record of events leading up to the failure. Along with providing debug data in a lab environment, hardware tracing can greatly enhance computer system serviceability. In the event of a failure in the field (e.g., customer location), this capability facilitates problem isolation and resolution. Further, once a problem is understood, design changes can be implemented to improve future reliability. Hardware controls, such as multiplexers, are provided to allow the user to select which signals are routed to the hardware arrays. Several hardware tracing modes may be defined to assist in debugging particular scenarios, and the multiplexers provide switching between the modes. A further mode is defined to facilitate instrumentation. Different sets of signals are routed, via the multiplexers, to the hardware arrays for hardware tracing and instrumentation. The instrumentation signals can be used for evaluating system performance.

Additional controls are provided to define events, upon which to capture data. Typical settings for collecting debug data using hardware tracing include starting on an instruction address. For instrumentation, it is desirable to start collecting data on a time increment and to capture a set of data on regular time intervals. During a typical instrumentation run, the multiplexers are set to route instrumentation signals to the hardware arrays, and the event controls are set to collect data on a time interval. Each time the interval expires, the instrumentation signals are captured and saved in the next available row within the hardware arrays. When all rows of the arrays have been filled, an interrupt invokes firmware to copy the data to a buffer in storage. Upon exiting the firmware routine, the run continues.

A major drawback to this existing approach is that running instrumentation entails switching the hardware controls into instrumentation mode, thereby disabling hardware tracing. Without hardware tracing enabled, failure analysis is extremely difficult, and reliability/availability/serviceability (RAS) is compromised. Thus, instrumentation is not typically run in the field at a customer site due to the resulting reduction in RAS.

It would be beneficial to allow instrumentation data to be captured while simultaneously running hardware tracing. To keep complexity and hardware costs to a minimum, it would be desirable to support instrumentation and hardware tracing without duplicating the entire collection of hardware currently used for hardware tracing. Additionally, it would be advantageous to allow sampling of instrumentation data in the field without reducing RAS. Accordingly, there is a need in the art for sampling computer system performance data without impacting RAS of the computer system.

BRIEF SUMMARY OF THE INVENTION

An exemplary embodiment includes a system for sampling computer system performance data. The system includes a sample buffer to store instrumentation data while capturing trace data in a trace array, where the instrumentation data enables measurement of computer system performance. The system further includes a sample interrupt generator to assert a sample interrupt indicating that the instrumentation data is available to read. The sample interrupt is asserted in response to storing the instrumentation data in the sample buffer.

Another exemplary embodiment includes a method for sampling computer system performance data. The method includes sampling instrumentation data in a sample buffer while capturing trace data in a trace array, where the instrumentation data enables measurement of computer system performance. The method also includes asserting a sample interrupt in response to sampling the instrumentation data. The sample interrupt indicates that the instrumentation data is available to read.

A further exemplary embodiment includes a computer program product for sampling computer system performance data. The computer program product includes a computer-readable storage medium storing instructions for executing sampling computer system performance data. The sampling computer system performance data includes a method of receiving an indicator of a sample interrupt, where the sample interrupt indicates that instrumentation data is available to read from a sample buffer for measurement of computer system performance. The method also includes selecting a data source to read as the sample buffer in response to receiving the indicator of the sample interrupt, where the sample buffer stores instrumentation data while capturing trace data in a trace array. The method further includes storing data from the selected data source to memory.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

An exemplary embodiment of the present invention provides computer system performance data sampling without impacting reliability/availability/serviceability (RAS) of the computer system. Through a combination of both hardware and firmware, instrumentation can be run without disabling hardware tracing in the computer system. Instrumentation allows samples of selected signals that are critical to performance measurement to be captured. A separate set of signals is available to collect debug data for hardware tracing. In an exemplary embodiment, both instrumentation and hardware tracing are concurrently supported. Using a set of latches to hold one sample of instrumentation data and a separate interrupt mechanism results in a minimal additional hardware cost for the improved RAS performance. Additionally, existing instrumentation support can remain in the design to provide both a legacy control mode and a new control mode.

Figure 1:
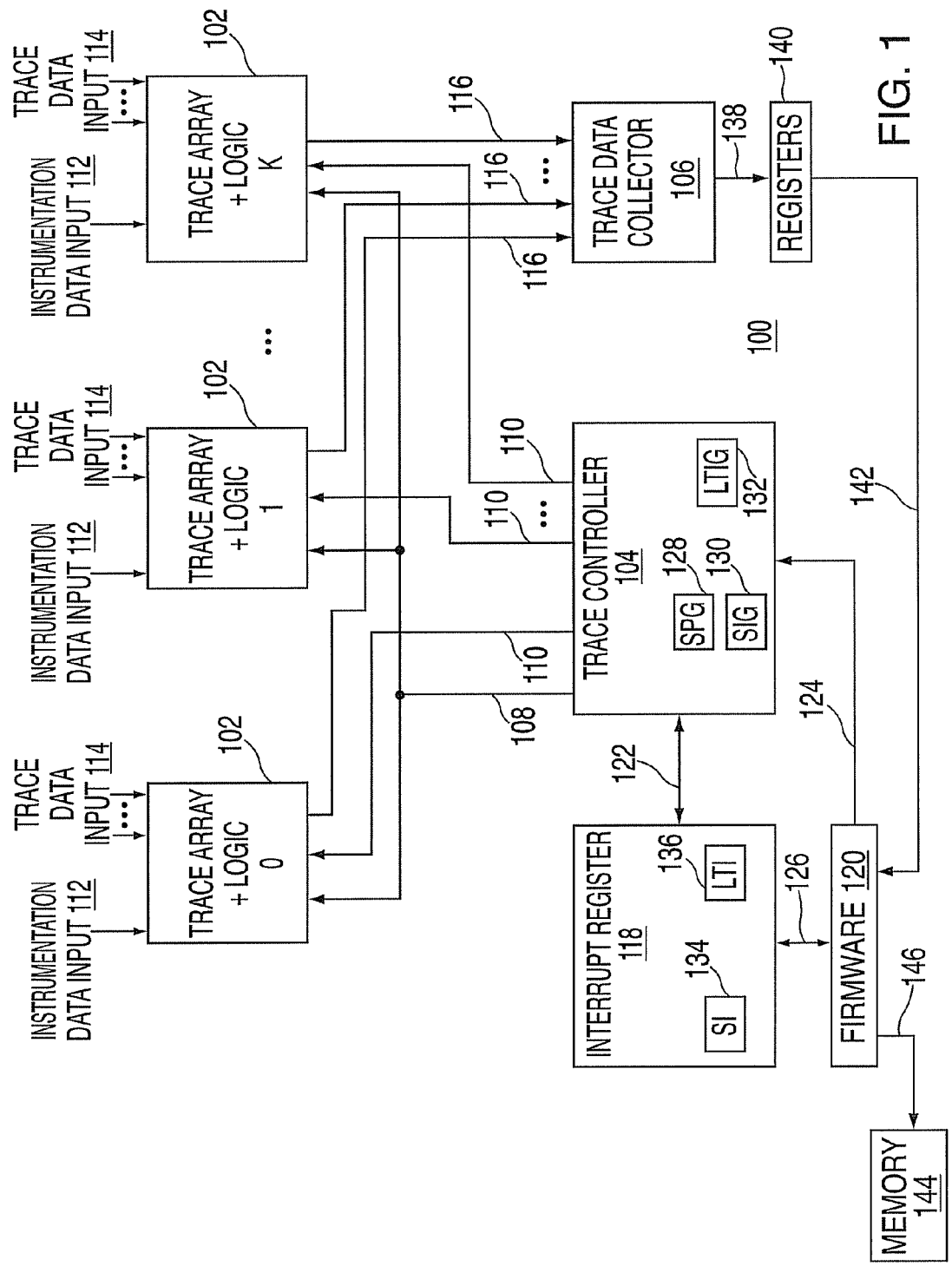
FIG. 1 depicts a block diagram of system upon which sampling performance data without impacting RAS of the system can be implemented in an exemplary embodiment.

Turning now to FIG. 1, a system 100 is depicted upon which sampling performance data without impacting RAS of the system is implemented in an exemplary embodiment. The system 100 includes multiple trace array and logic blocks 102, which may be physically distributed in hardware. For example, in one embodiment the system 100 is a microprocessor chip, where the trace array and logic blocks 102 are spread around on the chip surface or located in some designated part of the chip, such as the microprocessor core. In a single microprocessor, there may be ten or more instances of trace array and logic blocks 102, supporting a width of up to sixty-four or more bits for each. In an exemplary embodiment, the trace array and logic blocks 102 are spread out to place them nearby points of origination of the signals to be captured.

The system 100 also includes a trace controller 104 to control reading and writing data to/from the trace array and logic blocks 102. Data from the trace array and logic blocks 102 are returned to a trace data collector 106. Control signals are sent to the trace array and logic blocks 102 via paths 108 and 110. In an exemplary embodiment, path 108 sends signals via a fanout tree using repeaters/latches as required for the physical signal distribution to all interfaced trace array and logic blocks 102, while paths 110 provide individual control signals to the interfaced trace array and logic blocks 102. The paths 108 and 110 may be single bit or multi-bit busses, controlling sampling of instrumentation data input 112 and capturing of trace data input 114. Each of the trace array and logic blocks 102 can read both instrumentation data input 112 and trace data input 114. The trace array and logic blocks 102 output data on data return paths 116 to the trace data collect block 106. It will be understood that paths 108 and 110, as well as data return paths 116, can include elements known in the art that are not depicted, such as latches to accommodate for relative timing differences.

In an exemplary embodiment, the trace controller 104 interfaces with an interrupt register 118 and firmware 120 via paths 122 and 124 respectively. The interrupt register 118 provides information such as an interrupt source when an interrupt is asserted. The firmware 120 is low-level control code that provides instruction sequences for controlling instrumentation and hardware tracing operations, e.g., millicode. The firmware 120 can access the interrupt register 118 via path 126. The paths 122, 124, and 126 can be combined in any combination, including a single common bus. The trace controller 104 may also include sample pulse generator (SPG) 128 that generates sampling signals for controlling acquisition of the instrumentation data input 112 in the trace array and logic blocks 102. The trace controller 104 can also include a sample interrupt generator (SIG) 130 and a log trace interrupt generator (LTIG) 132 among other logic blocks (not depicted). Alternatively, the SPG 128, SIG 130, and/or LTIG 132 can be located external to the trace controller 104. The SIG 130 can assert a sample interrupt (SI), which is captured as SI indicator 134 in the interrupt register 118. Similarly, the LTIG 132 can assert a log trace interrupt (LTI), which is captured as LTI indicator 136 in the interrupt register 118.

Figure 2:
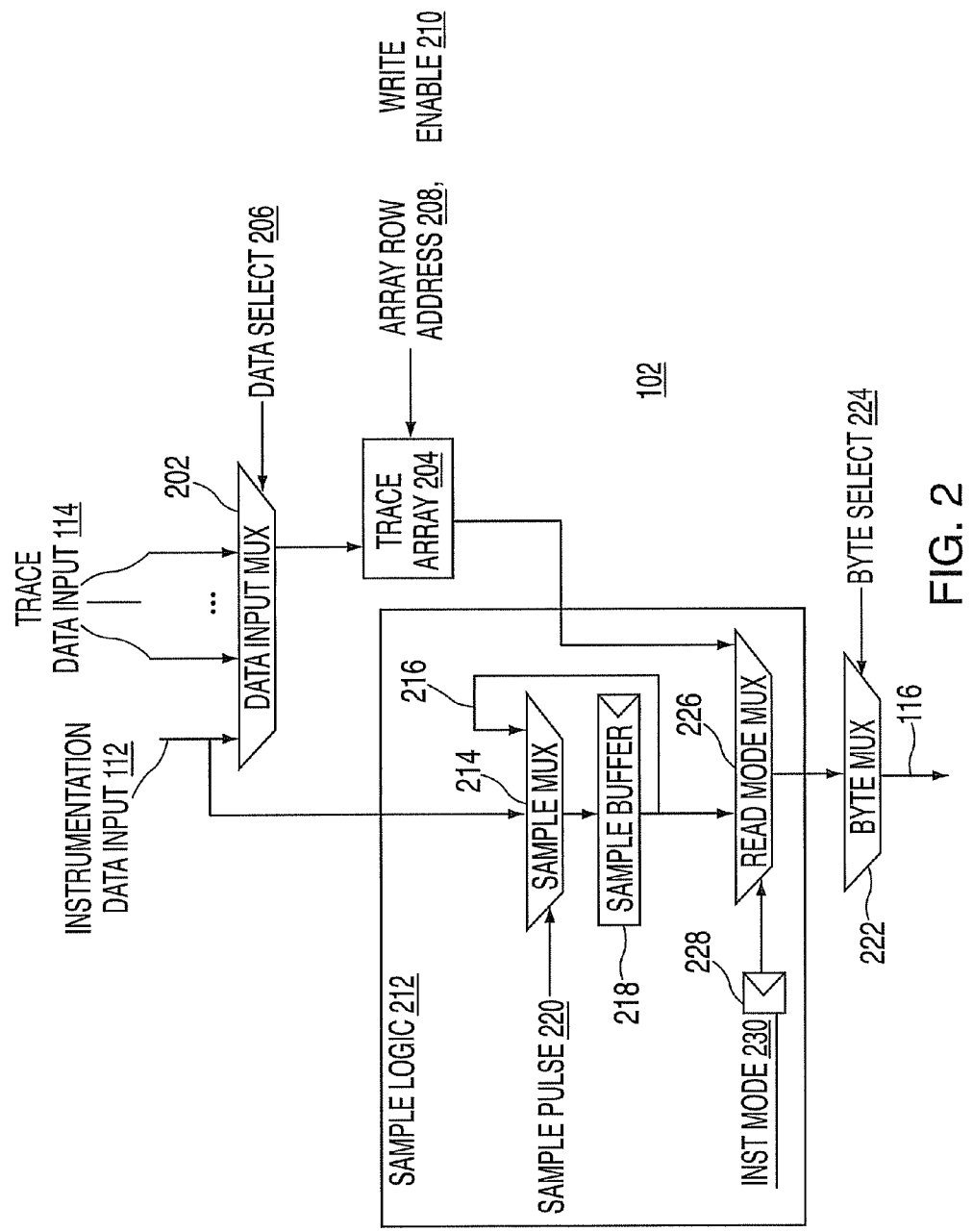
FIG. 2 depicts a block diagram of trace array and logic in accordance with an exemplary embodiment.

Turning now to FIG. 2, a block diagram of one of the trace array and logic blocks 102 of FIG. 1 is depicted in accordance with an exemplary embodiment. Instrumentation data input 112 and trace data input 114 are both input to a data input multiplexer (mux) 202. The data input mux 202 controls the source of input for capturing data in trace array 204. Using data select 206, the data input mux 202 selects between multiple input buses that can be routed to the trace array and logic blocks 102, as a limited set of data may be required to debug a specific problem. In an alternate embodiment, the data input mux 202 is omitted. The data select 206 is driven by the firmware 120 from a configuration register (not depicted) associated with each trace array and logic block 102. Alternatively, the data select 206 can be provided via path 108 or 110 of FIG. 1, as design dictates. The trace array 204 includes multiple rows of storage, with each row wide enough to capture a sample of multiple signals. The capturing of data in the trace array 204 is controlled by the trace controller 104 of FIG. 1, which provides an array row address 208 and write enable 210 via paths 108 or 110. The array row address 208 can be incremented every cycle on start event or periodically on a time basis. The trace controller 104 determines how the array row address 206 is incremented. When debug tracing is active, a continuously running trace is performed through writing selected trace data input 114 to the trace array 204, row-by-row. Instrumentation sampling periodically, or on an event basis, captures one array row. In an alternate exemplary embodiment, the data input mux 202 only selects from trace data input 114, not instrumentation data input 112.

The instrumentation data input 112 is also routed to sample logic 212. The sample logic 212 includes a sample mux 214, which receives instrumentation data 112 as input as well as a feedback signal 216 from sample buffer 218. Sample pulse 220 selects between the two inputs to the sample mux 214 for sampling. In contrast to the trace array 204, the sample buffer 218 stores one sample at a time. This is enough for most performance analysis requirements, as instrumentation data input 112 samples are taken slowly enough to allow reading the last sample before a new one is taken. The sample buffer 218 may have an equivalent width or a reduced width of a full array row in the trace array 204. A reduced width may be used since the number of signals that are interesting for performance analysis can be considerably less than the number of signals used for debugging using trace data.

To read the samples of the instrumentation data input 112, data return paths 116 of FIG. 1 can be used from the trace array and logic blocks 102 to the trace data collector 106 of FIG. 1. Due to area and wiring constraints, the data return paths 116 may not have the full array width of the trace array 204. Instead, a byte mux 222 can used to reduce the path width to one byte. The trace controller 104 of FIG. 1 provides a byte select 224 for controlling the byte mux 222, which can be sent via paths 108 or 110. A combination of the byte mux 222 and a read mode mux 226 allows instrumentation data samples from the sample buffer 218 to be placed in the data return path 116 previously reserved for reading the trace array 204. This provides an advantage in that read logic in the trace controller 104 can be left unchanged, allowing bytes to be read from the sample buffer 218 in the same manner as reading from the trace array 204. The row address is ignored, and instead of reading, for instance 256 rows, just one sample is read, where a sample may be as wide as a single row.

The read mode mux 226 selects either instrumentation data from the sample buffer 218 or data from the trace array 204 as input to the byte mux 222. The read mode mux 226 is controlled from a latch 228, which may in turn be set by decoding unused byte select 224 values as instrumentation mode 230. For example, if byte select 224 contains eight possible combinations, an unused combination can be used as instrumentation mode 230. Thus the firmware 120 of FIG. 1 can set the byte select 224 to a specified value. Alternatively, a separate single bit control wire may be implemented as instrumentation mode 230 via paths 108 or 110 of FIG. 1.

In summary, the sample buffer 218 can hold one sample of the instrumentation data input 112 and operate in parallel with the trace array 204. Regardless of the data input mux 202 setting, the sample buffer 218 can always collect the instrumentation data input 112. Using the sample buffer 218, the instrumentation data input 112 can be captured independent of the trace data input 114, allowing both hardware tracing and instrumentation sampling to be run together for simultaneous performance data collection and debug data collection. Additionally, the data input mux 202 can be set to route either the instrumentation data input 112 or the trace data input 114 to the trace array 204 as well, which can be useful for debugging and validating the hardware and firmware.

To allow instrumentation and hardware tracing to run simultaneously, a separate interrupt mechanism, SIG 130 of FIG. 1, is used for instrumentation. Since the sample buffer 218 is one entry deep, the sample interrupt invokes the firmware 120 of FIG. 1 on every data collection event. The firmware 120 determines the source of the interrupt using the interrupt register 118 of FIG. 1 and responds accordingly. If the source is hardware tracing, LTI 136 is set, and the firmware 120 selects and reads the trace array 204. Likewise, if the interrupt source is instrumentation, SI 134 is set, and the firmware 120 may store the instrumentation data to memory 144. The trace controller 104 turns off array write controls and sends appropriate array row address 208 and byte select 224 values through paths 108 and 110. This is triggered by the firmware 120 using path 124. The data that is read from the trace array 204 or sample buffer 218 is sent through path 116 together with a "data valid" indication. This is all that is needed for trace data collector 106 to start collecting the bytes of data. Interface 138 from the trace data collector 106 allows the data to be read to registers 140, which can be accessed by the firmware 120 via interface 142. The firmware 120 stores the debug/sample data to memory 144 via interface 146.

Figure 3:
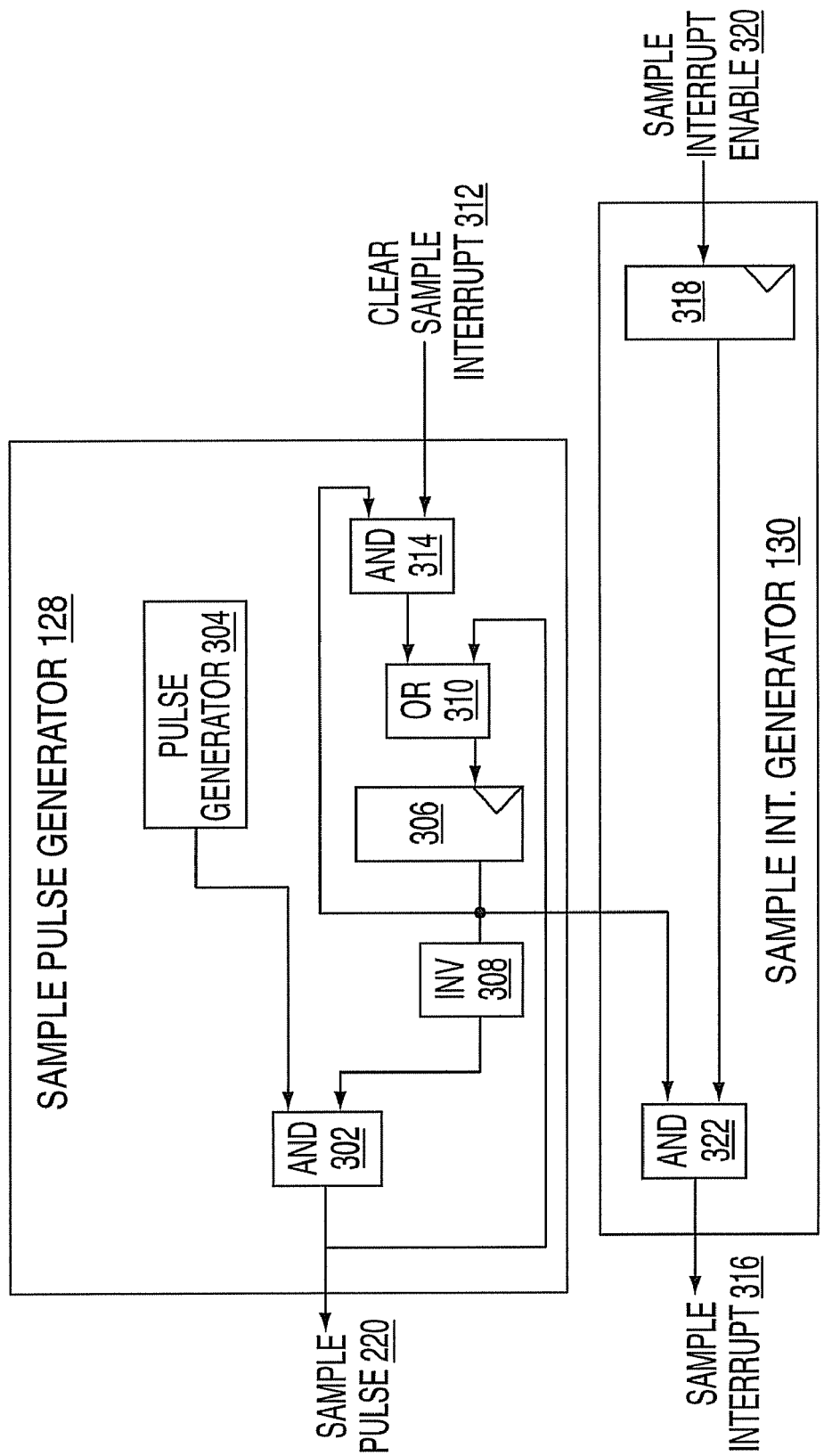
FIG. 3 depicts a block diagram of a sample pulse generator and a sample interrupt generator in accordance with an exemplary embodiment.

Turning now to FIG. 3, a block diagram of the SPG 128 and SIG 130 of FIG. 1 are depicted in accordance with an exemplary embodiment. In an exemplary embodiment, the sample pulse 220 of FIG. 2 is generated by AND-gate 302 through combining output of a pulse generator 304 with an inverted value of latch 306. The pulse generator 304 may include a configurable timer to periodically generate a pulse for sampling instrumentation data. An inverter 308 performs the signal inversion from latch 306. The latch 306 captures a state where a sample of instrumentation data input 112 was stored to the sample buffer 218 in FIG. 2, but not yet read by the firmware 120 of FIG. 1. The latch 306 is set from feedback from the sample pulse 220 and the value is held using OR-gate 310 as long as no clear sample interrupt 312 is received via AND-gate 314. In an exemplary embodiment, the clear sample interrupt 312 is commanded through firmware interface 124 once a sample captured in the sample buffer 218 of FIG. 2 has been read. The latch 306 also sources the SIG 130 to assert sample interrupt 316 that sets the SI 134 in the interrupt register 118 of FIG. 1. Latch 318 can be set and cleared by firmware 120 as sample interrupt enable 320 to prevent unwanted interruptions. An AND-gate 322 combines output of the latches 318 and 306 to perform enabling and disabling of the sample interrupt 316.

The use of the AND-gate 302 prevents new samples in the sample buffer 218 of FIG. 2 from being overwritten by sample pulse 220 until the firmware 120 gives explicit allowance to do so. Besides guaranteeing that each sample that was taken can be logged out, this also ensures that new instrumentation data samples cannot be saved to the sample buffer 218 while the firmware 120 is in the process of reading the sample buffers 218 across all of the trace array and logic blocks 102. Otherwise, this could lead to inconsistent samples that hold partial data from two different sample pulses from disparate instances in time.

The actual interrupt indication to the firmware 120 may be active when either an instrumentation data sample was stored to the sample buffer 218 or when the trace array 204 contents should be saved, as generated by LTIG 132. To facilitate differentiating the two events, the SI 134 and LTI 136 are available in the interrupt register 118 that is quickly read by the firmware 120 via path 126. In an exemplary embodiment, the SI 134 indicates that an instrumentation data input 112 sample was stored to the sample buffer 218; the other indicator, the LTI 136, indicates that the trace array 204 contents should be saved.

Figure 4:
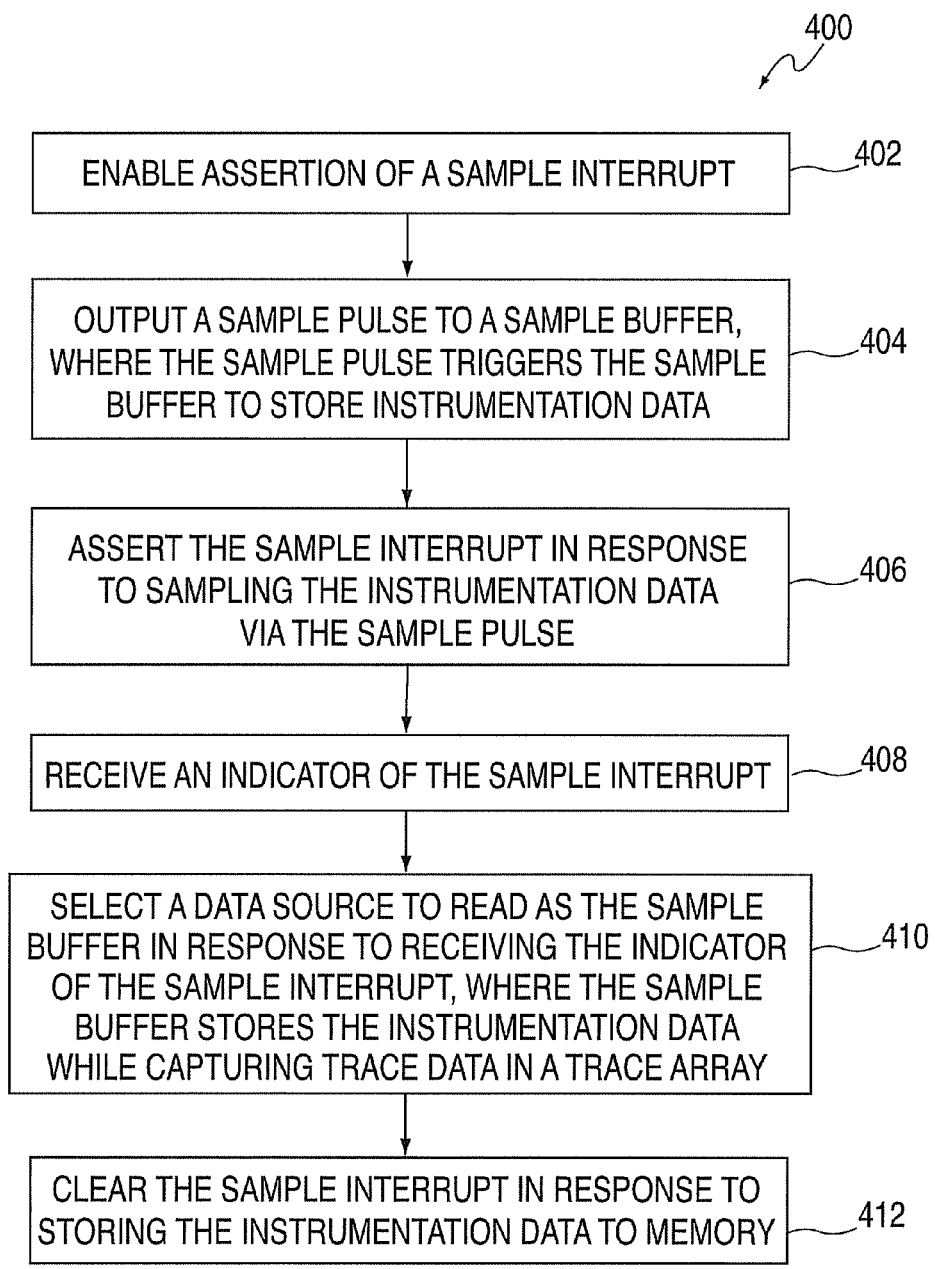
FIG. 4 depicts an exemplary process for sampling computer system performance data without impacting RAS of the computer system in accordance with an exemplary embodiment.

One example of a sequence performed by the firmware 120 upon receiving an interrupt from the trace controller 104 is depicted in FIG. 4 as part of a process 400 for sampling computer system performance data without impacting RAS of the computer system. At block 402, the firmware 120 enables assertion of the sample interrupt 316 via the sample interrupt enable 320. At block 404, the sample pulse generator 128 outputs sample pulse 220 to the sample buffer 218. The sample pulse 220 triggers the sample buffer 218 to store a sample of the instrumentation data input 112. The feedback signal 216 holds the sample in the sample buffer 218, providing a window of time for the firmware 120 to initiate a read of the sample buffer 218. At block 406, the sample interrupt generator 130 asserts sample interrupt 316 in response to sampling the instrumentation data via the sample pulse 220. The sample interrupt 316 indicates that the instrumentation data is available to read from the sample buffer 218 for measurement of computer system performance through configuration of the read mode mux 226 and the byte mux 222. At block 408, the firmware 120 receives an indicator of the sample interrupt 316. The firmware 120 can further discern the interrupt source by reading the interrupt register 118, e.g., SI 134 or LTI 136, where the LTI 136 is asserted in response to filling the trace array 204.

At block 410, the firmware 120 selects a data source to read as the sample buffer 218 in response to receiving the indicator of the sample interrupt 316, where the sample buffer 218 stores instrumentation data while capturing trace data in the trace array 204. Data from all of the trace array and logic blocks 120 can be read. At block 412, the firmware 102 commands the clear sample interrupt 312 in response to storing the data to memory 144. The clear sample interrupt 312 de-asserts the sample interrupt 316 and allows a new sample pulse 220 to be output for sampling instrumentation data.

Technical effects and benefits include sampling instrumentation data while storing trace data. The instrumentation data can be used for measuring performance of a computer system internally in a processor of the computer system with minimal hardware and firmware modifications. This approach eliminates the need to disable hardware tracing while sampling instrumentation data, thereby addressing RAS concerns associated with sampling instrumentation in the field, since capturing of data to detect and debug problems can be performed concurrently with sampling performance data.

As described above, the embodiments of the invention may be embodied in the form of computer-implemented processes and apparatuses for practicing those processes. Embodiments of the invention may also be embodied in the form of computer program code containing instructions embodied in tangible media, such as read-only memory (ROM), electrically erasable programmable read-only memory (EEPROM), flash memory, or any other computer-readable storage medium, wherein, when the computer program code is loaded and executed in a computer, the computer becomes an apparatus for practicing the invention. The computer program code may be firmware, e.g., firmware 120 of FIG. 1, embedded within an integrated circuit (IC) chip, such as a processor. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A system forسampling computer system performance data, the system comprising:
   a sample buffer to store instrumentation data while capturing trace data in a trace array, wherein the instrumentation data enables measurement of computer system performance;
   a sample interrupt generator to assert a sample interrupt indicating that the instrumentation data is available to read, wherein the sample interrupt is asserted in response to storing the instrumentation data in the sample buffer; and
   wherein the sample interrupt generator dc-asserts the sample interrupt in response to the command to clear the sample interrupt.

2. The system of claim 1 further comprising:
   a sample pulse generator to output a sample pulse triggering the sample buffer to store the instrumentation data.

3. The system of claim 2 wherein a command to clear the sample interrupt notifies the sample pulse generator of the read of the sample buffer.

4. The system of claim 1 further comprising:
   a read multiplexer, wherein the read multiplexer is configurable to output data on a data return path from either the trace array or the sample buffer.

5. The system of claim 1 further comprising:
   a log trace interrupt generator to assert a log trace interrupt upon filling the trace array; and
   an interrupt register holding interrupt source indicators for the log trace interrupt and the sample interrupt.

6. The system of claim 1 wherein the sample interrupt generator includes a sample interrupt enable latch to enable assertion of the sample interrupt.

7. The system of claim 1 wherein the sample buffer and the sample interrupt generator are integrated in a processor of the computer system.

8. A method for sampling computer system performance data, the method comprising:
   sampling instrumentation data in a sample buffer while capturing trace data in a trace array, wherein the instrumentation data enables measurement of computer system performance;
   asserting a sample interrupt in response to sampling the instrumentation data, wherein the sample interrupt indicates that the instrumentation data is available to read; and
   de-asserting the sample interrupt in response to the command to clear the sample interrupt.

9. The method of claim 8 further comprising:
   outputting a sample pulse to the sample buffer, wherein the sample pulse triggers the sample buffer to store the instrumentation data.

10. The method of claim 9 further comprising:
    receiving a command to clear the sample interrupt, wherein the command to clear the sample interrupt provides notice of a read of the sample buffer.

11. The method of claim 8 further comprising:
    configuring a read multiplexer to output data on a data return path from either the trace array or the sample buffer.

12. The method of claim 8 further comprising:
    asserting a log trace interrupt upon filling the trace array; and
    storing interrupt source indicators for the log trace interrupt and the sample interrupt.

13. The method of claim 8 further comprising:
    enabling assertion of the sample interrupt.

14. The method of claim 8 wherein sampling the instrumentation data and asserting the sample interrupt are performed in a processor.

15. A computer program product for sampling computer system performance data, the computer program product comprising:
    a computer-readable storage medium storing instructions for executing sampling computer system performance data, the sampling computer system performance data comprising a method of:
    receiving an indicator of a sample interrupt, wherein the sample interrupt indicates that instrumentation data is available to read from a sample buffer for measurement of computer system performance;

selecting a data source to read as the sample buffer in response to receiving the indicator of the sample interrupt, wherein the sample buffer stores instrumentation data while capturing trace data in a trace array;

enabling assertion of the sample interrupt; and clearing the sample interrupt in response to storing the instrumentation data to the memory;

storing data from the selected data source to memory.

16. The computer program product of claim 15 further comprising:

resetting a sample interrupt generator in response to clearing the sample interrupt, wherein the sample interrupt generator controls outputting of the sample interrupt.

17. The computer program product of claim 15 further comprising:

determining an interrupt source as one of the sample interrupt and a log trace interrupt, wherein the log trace interrupt is asserted in response to filling the trace array.

18. The computer program product of claim 15 wherein the sample buffer is one of a plurality of sample buffers and the trace array is one of a plurality of trace arrays, and further wherein selecting the data source to read is performed for the plurality of sample buffers and the plurality of trace arrays.

19. The computer program product of claim 15 wherein the instructions are firmware in a processor of the computer system.

* * * * *